3,227,727
DIIMIDAZOL-1-YL DERIVATIVES OF PHOSPHINE OXIDE AND A PROCESS FOR THEIR PREPARATION
Robert Z. Greenley, St. Louis, Mo., and Morris L. Nielsen, Dayton, Ohio, assignors to Monsanto Research Corporation, St. Louis, Mo., a corporation of Delaware
No Drawing. Filed July 10, 1963, Ser. No. 294,179
4 Claims. (Cl. 260—309)

This application is a continuation-in-part of my application Serial No. 163,056, filed December 29, 1961, and now abandoned.

This invention relates to organic compounds of phosphorus and nitrogen and more particularly provides a new and valuable class of heterocyclic nitrogen-substituted phosphine oxides.

According to the invention, there are prepared certain aromatic hydrocarbyl diimidazol-1-ylphosphine oxides by the reaction of imidazole with an aromatic hydrocarbylphosphonic dichloride, substantially according to the scheme:

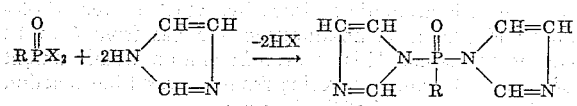

wherein R is aromatic hydrocarbyl which is free of olefinic and acetylenic unsaturation and contains from 6 to 12 carbon atoms and X is halogen having an atomic weight of at least 35.

Presently useful hydrocarbyl phosphonic dihalides are phenyl- or alkylphenylphosphonic dichlorides, dibromides or diiodides such as phenylphosphonic dichloride or dibromide, o-, m- or p-tolylphosphonic dibromide or diiodide, o-, m- or p-ethylphenylphosphonic dichloride or diiodide, o-, m- or p-butylphenylphosphonic dichloride or dibromide, o-, m- or p-hexylphenylphosphonic dibromide or diiodide, 2,3-, 3,4- or 4,5-dipropylphenylphosphonic dibromide or dichloride, pentamethylphenylphosphonic dichloride or dibromide; cycloalkylphenylphosphonic dibromides or dichlorides such as o-, m- or p-cyclohexyl or (2-methylcyclopentyl)phenylphosphonic dichloride or dibromide; o-, m- or p-biphenylylphosphonic dichloride or dibromide; 1-acenaphthenylphosphonic dibromide or dichloride, α- or β-naphthylphosphonic dibromide or diiodide, etc.

Diimidazol-1-ylarylphosphine oxides provided by the invention are e.g., diimidazol-1-ylphenyl-, diimidazol-1-yl-o-, m-, or p-tolyl-, diimidazol-1-yl-o-, m- or p-isopropylphenyl-, diimidazol-1-yl-o-, m- or p-pentylphenyl-, diimidazol-1-yl-2,3- or 3,4- or 4,5-dimethylphenyl-, diimidazol-1-yl-o-, m- or p-cyclohexylphenyl-, diimidazol-1-yl-o-, m- or p-biphenylyl-, or diimidazol-1-yl-α-methyl-β-naphthyl-phosphine oxide.

Reaction of the aromatic hydrocarbylphosphonic dihalide with the imidazole to give the presently provided diimidazol-1-ylhydrocarbylphosphine oxides is conducted by simply mixing the two reactants and allowing the mixture to stand until formation of said phosphine oxide compound is completed. Advantageously, in order to obtain smooth reaction and optimum yield of the product, the reaction is conducted in the presence of an inert organic liquid diluent or solvent, which may be, e.g., an aliphatic or aromatic hydrocarbon such as hexane, benzene or xylene, a chlorinated hydrocarbon such as chloroform, carbon tetrachloride or chlorobenzene; an ether such as butyl ether, morpholine or tetrahydrofuran; a tertiary amide such as dimethylformamide; a sulfoxide such as dimethyl sulfoxide, etc.

The reaction is generally exothermic; hence, heating is usually not required and may be conducted by operating at ambient temperatures, or even with cooling. However, when working with the somewhat sluggish higher hydrocarbylphosphonic dihalides, e.g., the biphenylylphosphonic dichlorides or the cyclohexylphosphonic dibromides, heating may be used for the purpose of decreasing reaction time. Temperatures of from, say, 60° C. to 150° C. are thus useful. When working in the presence of a diluent or solvent, refluxing temperatures of the reaction mixture are conveniently employed to assure completion of the reaction.

Since reaction occurs with liberation of hydrogen halide, it is conveniently effected in the presence of a basic agent which will serve as hydrogen halide scavenger by forming a solid hydrohalide. Conveniently, an excess of the imidazole may be used for this purpose. However, the scavenger may be any organic or inorganic base which does not react with the phosphonic dihalide in preference to the imidazole, e.g., a tertiary alkylamine such as trimethylamine or tributylamine; a heterocyclic nitrogen base such as N-methylmorpholine or pyridine, etc. An excess of the imidazole is preferred.

Instead of using a hydrogen halide scavenger, or together with the scavenger, mechanical provision may be made for removal of the halide as it is formed, e.g., by means of vigorous stirring and/or dephlegmation.

One mole of the aromatic hydrocarbylphosphonic dihalide reacts with two moles of the imidazole to give the present diimidazol-1-ylhydrocarbylphosphine oxides; hence, the two reactants may be employed in such stoichiometric proportions. However, as above-stated, an excess of the imidazole is conveniently used for the purpose of serving as scavenger for the by-product hydrogen halide. The hydrohalide thus formed is readily removed from the reaction product by filtering or centrifuging, since it is insoluble in most organic solvents and in the reactants. Any excess of phosphonic dihalide or of imidazole may be separated by distillation.

The presently provided diimidazol-1-ylhydrocarbyl phosphine oxides are stable, well-defined compounds which are generally high-melting, crystalline solids. They are particularly valuable as starting materials for the preparation of linear, polymeric phosphonamides by reaction with hydrocarbon diamines. Thus, as disclosed in our application Serial No. 163,056, filed December 29, 1961, and now abandoned, and in our copending application Serial No. 294,182, filed July 10, 1963, and now abandoned, with an alkylenediamine they react as follows:

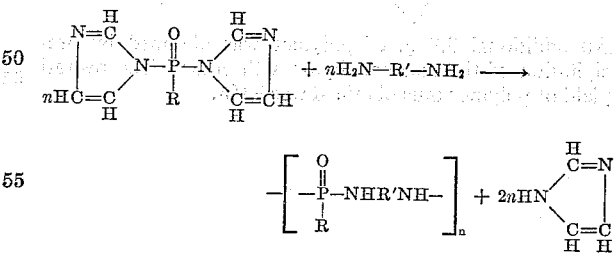

wherein R is the herein defined aromatic hydrocarbyl radical and R' is an alkylene radical having from 3 to 15 carbon atoms and having the two nitrogen atoms attached to diverse, non-adjacent carbon atoms.

The polyphosphonamides thus obtained are solid resinous materials which are readily compression molded to give objects which are tough, transparent, highly heat-resistant and of good dimensional stability, or which may be cast into films from solutions or extruded into fibers.

The presently provided diimidazol-1-ylhydrocarbylphosphine oxides are likewise valuable as biological toxicants, as lubricant additives, as plasticizers for a variety of synthetic resins and plastics.

Example 1

To a stirred solution of 17.0 g. (0.25 mole) of imidazole in 400 ml. of tetrahydrofuran there was added a solution of 12.2 g. (0.063 mole) of phenylphosphonic dichloride in 75 ml. of tetrahydrofuran, over a 15-minute period and under nitrogen. The reaction was then stirred at gentle reflux for 3 hours. After cooling to room temperature, the solid imidazole hydrochloride which had formed as by-product was filtered off under nitrogen by means of a filter stick, and the product was obtained in tetrahydrofuran solution. Removal of the tetrahydrofuran by distillation and vacuum drying of the residual white solid gave the substantially pure diimidazol-1-ylphenylphosphine oxide, M.P. 98–100° C., giving by nuclear magnetic resonance analysis in dimethylformamide for $P^{31}$ a single peak at −6 p.p.m.

Example 2

A solution of 54.4 g. (0.8 mole) of imidazole in 700 ml. of toluene was azeotroped to remove any moisture and cooled to 50–55° C. To it was then added, dropwise during 5 minutes, 28.6 ml. (39 g., 0.2 mole) of phenylphosphonic dichloride at a maximum temperature of 65° C. Solids formed quickly. The whole was heated at reflux for 30 minutes, then cooled to about 85–90° C., and finally filtered under nitrogen pressure with a filter stick to remove by-product hydrochloride. Removal of toluene from the filtrate gave the substantially pure diimidazol-1-ylphenylphosphine oxide by crystallization.

Example 3

A mixture of 0.06 mole of diimidazol-1-ylphenylphosphine oxide and 6.25 g. (0.06 mole) of p-phenylenediamine was heated at 160° C. for 1.5 hours under a nitrogen stream. Introduction of nitrogen was then discontinued, vacuum (0.3 mm. Hg) was applied and heating was conducted at 190° C. for 2 hours under the vacuum. Methanol was added to the product and methanol-insoluble material was separated. Upon treating the residual methanol solution with ethanol, there precipitated out 2.6 g. of polymeric product, M.P. 245–255° C., and consisting essentially of the repeating unit:

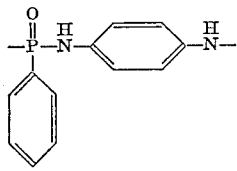

An additional 3.9 g. of polymer was obtained by precipitation of the residual liquor with ether. The overall yield of polymer thus obtained was 83%.

The polymer was insoluble in water, methanol, dimethylformamide, m-cresol, benzyl alcohol, and nitrobenzene and soluble in dimethyl sulfoxide, 98% formic acid and trifluoroacetic acid.

The above examples are given by way of illustration only, and the present invention is not to be considered as limited by them. It will be obvious to those skilled in the art that many modifications can be made within the spirit of the invention, which is limited only by the terms of the appended claims.

What we claim is:

1. A compound of the formula

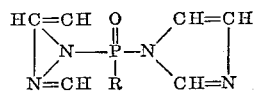

wherein R is aromatic hydrocarbyl which is free of olefinic and acetylenic unsaturation and has from 6 to 12 carbon atoms.

2. Diimidazol-1-ylphenylphosphine oxide.

3. The method which comprises contacting imidazole with a dihalide of the formula

wherein R is aromatic hydrocarbyl which is free of olefinic and acetylenic unsaturation and has from 6 to 12 carbon atoms and X is halogen having an atomic weight of at least 35, and recovering from the resulting reaction product a compound of the formula

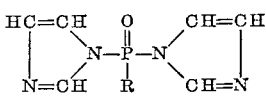

wherein R is as above defined.

4. The method which comprises contacting imidazole with phenylphosphonic dichloride and recovering diimidazol-1-ylphenylphosphine oxide from the resulting reaction product.

References Cited by the Examiner

UNITED STATES PATENTS 3,075,011    1/1963    Garner et al. _____ 260—551

FOREIGN PATENTS 848,952    9/1960    Great Britain.

OTHER REFERENCES

Kosolapoff et al.: Jour. Org. Chem., vol. 21, 413–14 (1956).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,227,727 January 4, 1966

Robert Z. Greenley et al.

It is hereby certified that error appears in the above numbered patent requiring correction and that the said Letters Patent should read as corrected below.

Column 1, line 40, for "dischloride" read -- dichloride --; column 4, lines 12 and 15, the formula should appear as shown below instead of as in the patent:

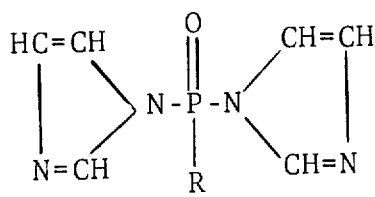

Signed and sealed this 5th day of September 1967.

(SEAL)
Attest:

ERNEST W. SWIDER
Attesting Officer

EDWARD J. BRENNER
Commissioner of Patents